United States Patent
Song et al.

(10) Patent No.: US 7,492,701 B2
(45) Date of Patent: Feb. 17, 2009

(54) APPARATUS AND METHOD FOR CONTROLLING ADAPTIVE MODULATION AND CODING IN AN ORTHOGONAL FREQUENCY DIVISION MULTIPLEXING COMMUNICATION SYSTEM

(75) Inventors: Kee-Bong Song, Chuncheon-si (KR); Dong-Jun Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 723 days.

(21) Appl. No.: 10/992,164

(22) Filed: Nov. 18, 2004

(65) Prior Publication Data
US 2005/0157639 A1 Jul. 21, 2005

(30) Foreign Application Priority Data
Nov. 19, 2003 (KR) .................. 10-2003-0082327

(51) Int. Cl.
*H04J 11/00* (2006.01)
(52) U.S. Cl. .................................. 370/208; 455/23
(58) Field of Classification Search ........................ None
See application file for complete search history.

(56) References Cited

U.S. PATENT DOCUMENTS

| 5,479,447 | A | 12/1995 | Chow et al. |
| 6,175,550 | B1 * | 1/2001 | van Nee ................ 370/206 |
| 6,865,393 | B1 * | 3/2005 | Baum et al. ............ 455/452.2 |
| 7,245,879 | B2 * | 7/2007 | Sadri et al. ............ 455/67.11 |
| 7,385,915 | B2 * | 6/2008 | Stolpman et al. ......... 370/208 |
| 2002/0102940 | A1 * | 8/2002 | Bohnke et al. ............ 455/23 |
| 2003/0039227 | A1 * | 2/2003 | Kwak ..................... 370/330 |
| 2003/0043732 | A1 | 3/2003 | Walton et al. |
| 2004/0120347 | A1 * | 6/2004 | Lee et al. ................ 370/468 |
| 2005/0002326 | A1 * | 1/2005 | Ling et al. .............. 370/208 |
| 2005/0032514 | A1 * | 2/2005 | Sadri et al. .............. 455/423 |
| 2005/0157639 | A1 * | 7/2005 | Song et al. .............. 370/208 |

(Continued)

FOREIGN PATENT DOCUMENTS

JP 11-163823 6/1999

(Continued)

OTHER PUBLICATIONS

Li Zhen, et al., "A Modified Sub-Optimum Adaptive Bit and Power Allocation Algorithm in Wideband OFDM System", Beijing University of Posts and Telecommunications, May 2003.

*Primary Examiner*—Firmin Backer
*Assistant Examiner*—Phuongchau B Nguyen
(74) *Attorney, Agent, or Firm*—The Farrell Law Firm, PC

(57) ABSTRACT

A method and apparatus for controlling AMC in an OFDM communication system in which an entire frequency band is divided into a plurality of sub-carrier bands. In the AMC controlling method, power and a number of transmission bits are calculated for each of the sub-carriers in a predetermined method for each of coding methods available in the OFDM communication system. A data rate for each of the coding methods is calculated based on the number of transmission bits and the power for each sub-carrier. A coding method having a highest of the calculated data rates is selected and a modulation method is determined according to a number of transmission bits in the determined coding method.

13 Claims, 6 Drawing Sheets

U.S. PATENT DOCUMENTS

| | | | |
|---|---|---|---|
| 2005/0286409 A1* | 12/2005 | Yoon et al. | 370/210 |
| 2006/0115014 A1* | 6/2006 | Jeong et al. | 375/267 |
| 2007/0036071 A1* | 2/2007 | Herdin | 370/210 |
| 2007/0191065 A1* | 8/2007 | Lee et al. | 455/562.1 |
| 2007/0211810 A1* | 9/2007 | Bohnke et al. | 375/260 |

FOREIGN PATENT DOCUMENTS

| | | |
|---|---|---|
| JP | 2000-358008 | 12/2000 |
| JP | 2002-344417 | 11/2002 |
| JP | 2003-023411 | 1/2003 |
| JP | 2003-060609 | 2/2003 |
| JP | 2004-129241 | 4/2004 |
| JP | 2005-537750 | 12/2005 |
| WO | WO 02/054695 | 7/2002 |
| WO | WO 03/001702 | 1/2003 |
| WO | WO 2004/021634 | 3/2004 |

\* cited by examiner

APPARATUS AND METHOD FOR CONTROLLING ADAPTIVE MODULATION AND CODING IN AN ORTHOGONAL FREQUENCY DIVISION MULTIPLEXING COMMUNICATION SYSTEM

PRIORITY

This application claims priority under 35 U.S.C. § 119 to an application entitled "Apparatus and Method for Controlling Adaptive Modulation and Coding in an Orthogonal Frequency Division Multiplexing Communication System" filed in the Korean Intellectual Property Office on Nov. 19, 2003 and assigned Serial No. 2003-82327, the contents of which are incorporated herein by reference.

BACKGROUND OF THE INVENTION

1. Field of the Invention

The present invention relates generally to interleaving in an OFDM (Orthogonal Frequency Division Multiplexing) communication system, and in particular, to an apparatus and method for controlling AMC (Adaptive Modulation and Coding).

2. Description of the Related Art

With the introduction of a cellular mobile communication system in the U.S. in the late 1970's, Korea started to provide a voice communication service in a first generation (1G) analog mobile communication system, AMPS (Advanced Mobile Phone Service). In the mid 1990's, Korea deployed a second generation (2G) mobile communication system, CDMA (Code Division Multiple Access) to provide voice and low-speed data services.

In the late 1990's, Korea partially deployed a third generation (3G) mobile communication system, IMT-2000 (International Mobile Telecommunication-2000), aiming at advanced wireless multimedia service, worldwide roaming, and high-speed data service. The 3G mobile communication system was developed specifically to transmit data at high rate along with the rapid increase of serviced data amount.

Currently, the 3G mobile communication system is evolving to a fourth generation (4G) mobile communication system. The 4G mobile communication system is under standardization for the purpose of efficient interworking and integrated service between a wired communication network and a wireless communication network, beyond simple wireless communication service, which the previous-generation mobile communication systems provide. It follows that a technology of transmitting a large volume of data at a same capacity level available in the wired communication network must be developed for the wireless communication network.

In this context, studies are actively conducted on OFDM as a useful scheme for high-speed data transmission on a wired/wireless channels in the 4G mobile communication system. OFDM is a special type of MCM (Multi Carrier Modulation) in which a serial symbol sequence is converted to parallel symbol sequences and modulated to a plurality of mutually orthogonal sub-carriers (or sub-carrier channels).

In OFDM, the orthogonality between the sub-carriers enables optimum transmission efficiency in high-speed data transmission. Also, the robustness against multi-path fading further contributes to the optimum transmission efficiency. Frequency spectrums are overlapped, resulting in efficient frequency use and robustness against frequency selective fading and multi-path fading. OFDM uses a guard interval to thereby alleviate the effects of inter-symbol interference (ISI), enables simple designing of an equalizer, and is robust against impulse noise. These advantages have made OFDM widely used in high-speed, large-volume data communication systems such as IEEE (Institute of Electrical and Electronics Engineers) 802.16a and IEEE 802.16e.

FIG. 1 is a schematic block diagram of a transmitter in a conventional OFDM communication system. Referring to FIG. 1, the transmitter comprises an encoder 111, an interleaver 113, a symbol mapper 115, a serial-to-parallel converter (SPC) 117, a pilot symbol inserter 119, an IFFT (Inverse Fast Fourier Transformer) 121, a parallel-to-serial converter (PSC) 123, a guard interval inserter 125, a digital-to-analog converter (DAC) 127, and an RF (Radio Frequency) processor 129.

User data bits or control data bits to be transmitted are generated and provided to the encoder 111. The user data bits or control data bits are commonly called information data bits. The encoder 111 encodes the information data bits in a predetermined coding method such as convolutional coding or turbo coding having a predetermined coding rate. The interleaver 113 interleaves the coded bits in a predetermined interleaving method.

The symbol mapper 115 maps the interleaved bits to modulation symbols in a predetermined modulation method such as QPSK (Quadrature Phase Shift Keying), QAM (Quadrature Amplitude Modulation) or 16 QAM (16-ary QAM). The SPC 117 converts a serial modulation symbol sequence to parallel symbols. The pilot symbol inserter 119 inserts pilot symbols in the parallel modulation symbols.

The IFFT 121 performs an N-point inverse fast Fourier transformation on the signal received from the pilot symbol inserter 119. The PSC 123 serializes the IFFT symbols, and the guard interval inserter 125 inserts a guard interval in the serial symbols. The guard interval eliminates interference between an OFDM symbol transmitted in a previous OFDM symbol time and a current OFDM symbol to be transmitted in a current OFDM symbol time. The guard interval can be produced as a cyclic prefix or as a cyclic postfix. The cyclic prefix is created by copying a predetermined number of last samples of an OFDM symbol in the time domain and inserting them in an effective OFDM symbol, while the cyclic postfix is created by copying a predetermined number of first samples of an OFDM symbol in the time domain and inserting them in an effective OFDM symbol.

The DAC 127 converts the digital signal received from the guard interval inserter 125 to an analog signal. The RF processor 129, including a filter and a front end unit, processes the analog signal such that it can be transmitted. The RF signal is transmitted via a transmit antenna.

FIG. 2 is a schematic block diagram of a receiver in the conventional OFDM communication system. Referring to FIG. 2, the receiver comprises an RF processor 211, an ADC 213, a guard interval remover 215, an SPC 217, an FFT (Fast Fourier Transformer) 219, an equalizer 221, a pilot symbol extractor 223, a channel estimator 225, a PSC 227, a symbol demapper 229, a deinterleaver 231, and a decoder 233.

A signal transmitted from the transmitter illustrated in FIG. 1 experiences a multi-path channel and is received as a signal including noise by a receive antenna. The RF processor 211 downconverts the signal received from the receive antenna to an IF (Intermediate Frequency) signal. The ADC 213 converts the analog IF signal to a digital signal and the guard interval remover 215 removes a guard interval from the digital signal. The SPC 217 parallelizes the serial signal received from the guard interval remover 215 and the FFT 219 performs an N-point fast Fourier transformation on the parallel signals. The equalizer 221 channel-equalizes the FFT signal, and the PSC 227 serializes the equalized signal.

Meanwhile, the pilot symbol extractor 223 detects pilot symbols from the FFT signal and the channel estimator 225 estimates a channel using the pilot symbols and provides the channel estimation result to the equalizer 221. The receiver creates a CQI (Channel Quality Information) corresponding to the channel estimation result and transmits the CQI to the transmitter through a CQI transmitter (not shown).

The symbol demapper 229 demodulates the serial signal received from the PSC 227 in a demodulation method corresponding to the modulation method used in the transmitter. The deinterleaver 231 deinterleaves the demodulated symbols in a deinterleaving method corresponding to the interleaving method used in the transmitter. The decoder 233 decodes the deinterleaved symbols in a decoding method corresponding to the coding method used in the transmitter and outputs original information data bits.

As described above, the same transmit power and the same number of transmission bits are assigned to all sub-carriers, and a channel coding method is preset according to the transmission bits in the typical OFDM communication system. The signal transmitted from the transmitter reaches the receiver from multiple paths. Therefore, the received signal has experienced frequency selective fading. Although the transmitter transmits the signal on sub-carriers having the same transmit power and the same number of transmission bits, the receiver receives signals on the sub-carriers, which have different frequency responses due to the frequency selective fading. Accordingly, the channel decoder of the receiver corrects errors in the erroneous signal.

The above OFDM communication system uses a bit-interleaved coded modulation scheme. The bit-interleaved coded modulation scheme leads to a code diversity by which the performance of the receiver is improved as the fading coefficients of the sub-carriers are less correlated and fading changes fast. However, using a bit-interleaved coded modulation scheme results in a low frequency selectivity, that is, a less time-varying channel and a short channel delay spread in a radio environment as indoors, while it has a decreased error correction capability for a quasi-static frequency selective fading channel. Accordingly, the number of transmission bits on each sub-carrier is reduced or the total transmit power is increased to satisfy an error correction capability requirement set in the OFDM communication system. As a result, resource efficiency is decreased.

SUMMARY OF THE INVENTION

An object of the present invention is to substantially solve at least the above problems and/or disadvantages and to provide at least the advantages below.

Accordingly, an object of the present invention is to provide an apparatus and method for controlling AMC in an OFDM communication system.

Another object of the present invention is to provide an apparatus and method for controlling AMC to satisfy an error correction capability requirement set in an OFDM communication system.

A further object of the present invention is to provide an apparatus and method for controlling AMC to provide a maximum data rate with a minimum transmit power in an OFDM communication system.

The above objects are achieved by a method and apparatus for controlling AMC in an OFDM communication system in which an entire frequency band is divided into a plurality of sub-carrier bands.

According to one aspect of the present invention, in an AMC controlling method in an OFDM communication system in which an entire frequency band is divided into a plurality of sub-carrier bands, power and a number of transmission bits are calculated for each of the sub-carriers in a predetermined method for each of coding methods available in the OFDM communication system. A data rate for each of the coding methods is calculated based on the number of transmission bits and the power for each sub-carrier. A coding method having a highest of the calculated data rates is selected and a modulation method is determined according to the number of transmission bits in the determined coding method.

According to another aspect of the present invention, in an AMC controlling apparatus in an OFDM communication system in which an entire frequency band is divided into a plurality of sub-carrier bands, an AMC controller calculates power and the number of transmission bits for each of the sub-carriers in a predetermined method for each of coding methods available in the OFDM communication system, calculates a data rate for each of the coding methods based on the number of transmission bits and the power for each sub-carrier, determines a coding method having the highest of the calculated data rates for the OFDM communication system, and determines a modulation method for the OFDM communication system according to the number of transmission bits in the determined coding method. An encoder encodes input information data bits in the determined coding method, and a modulator modulates coded bits received from the encoder in the determined modulation method.

According to a further aspect of the present invention, in a method of receiving a signal transmitted in an AMC scheme from a transmitter in an OFDM communication system in which an entire frequency band is divided into a plurality of sub-carrier bands, the received signal is RF-processed and an FFT is performed on the RF-processed signal. The FFT signal is demodulated in correspondence with a modulation method used in the transmitter. The demodulated signal is decoded in correspondence with a coding method used in the transmitter and thus output as information data bits.

According to still another aspect of the present invention, in an apparatus for receiving a signal transmitted in an AMC scheme from a transmitter in an OFDM communication system in which an entire frequency band is divided into a plurality of sub-carrier bands, a receiver RF-processes the received signal and performs an FFT on the RF-processed signal. A demodulator demodulates the FFT signal in correspondence with a modulation method used in the transmitter, and a decoder decodes the demodulated signal in correspondence with a coding method used in the transmitter and outputs information data bits.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail since they would obscure the invention in unnecessary detail.

The present invention provides an AMC scheme for an OFDM communication system. More specifically, the present invention provides an AMC scheme that enables data transmission/reception with a minimum transmit power, while satisfying an error correction capability requirement set for the OFDM communication system and providing a maximum data rate.

Figure 1:
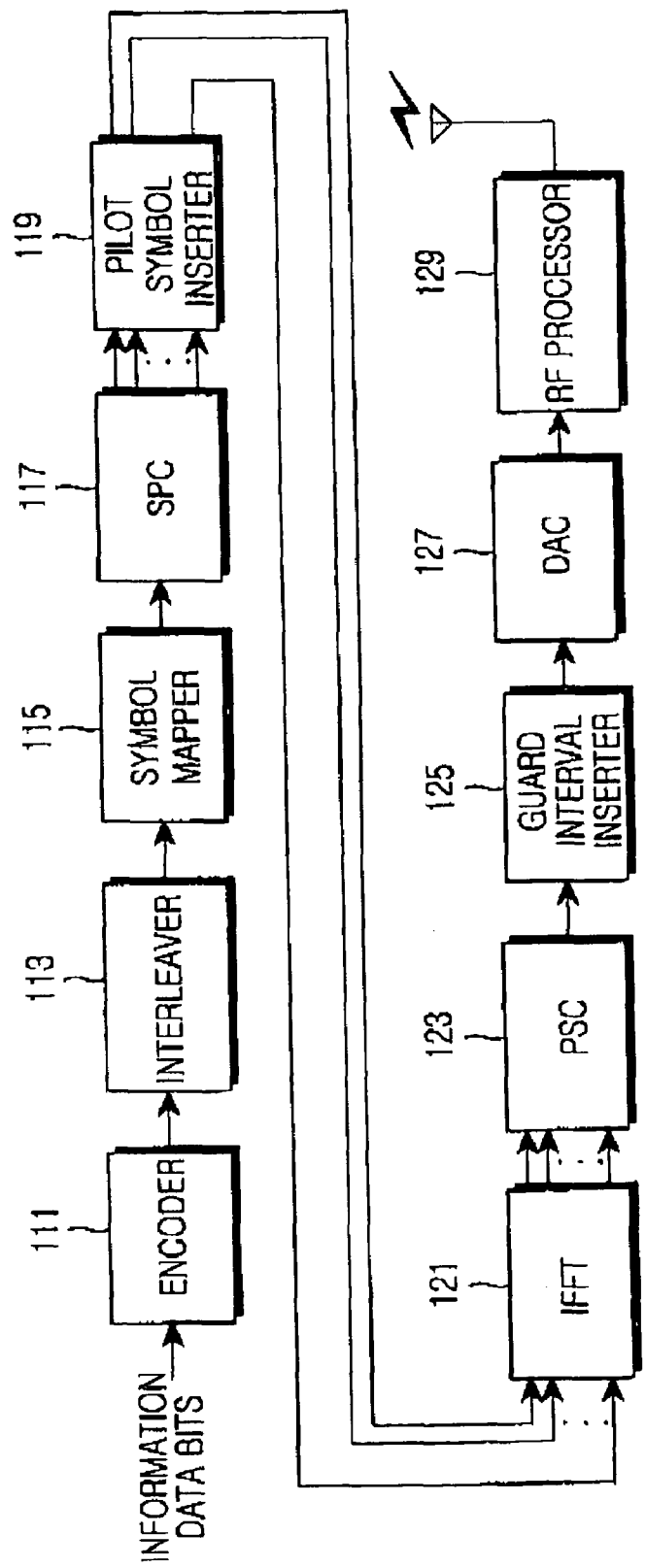
FIG. 1 is a schematic block diagram of a transmitter in a conventional OFDM communication system.
Figure 2:
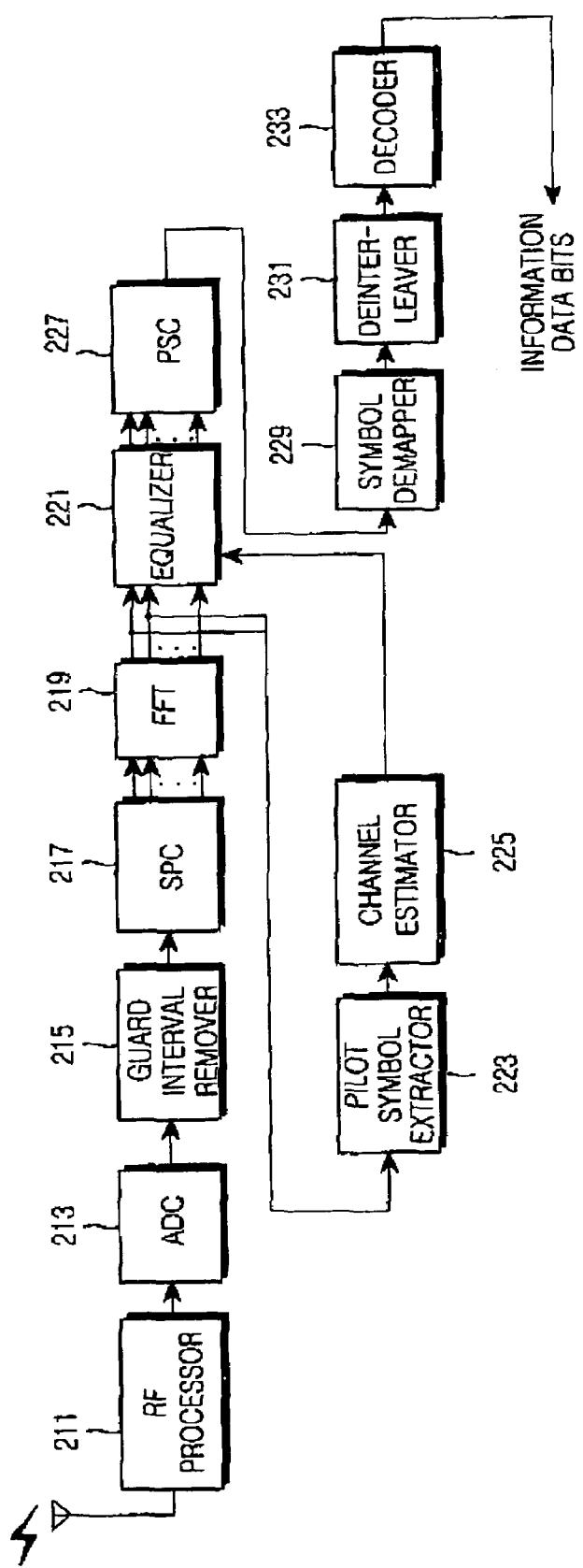
FIG. 2 is a schematic block diagram of a receiver in the conventional OFDM communication system.
Figure 3:
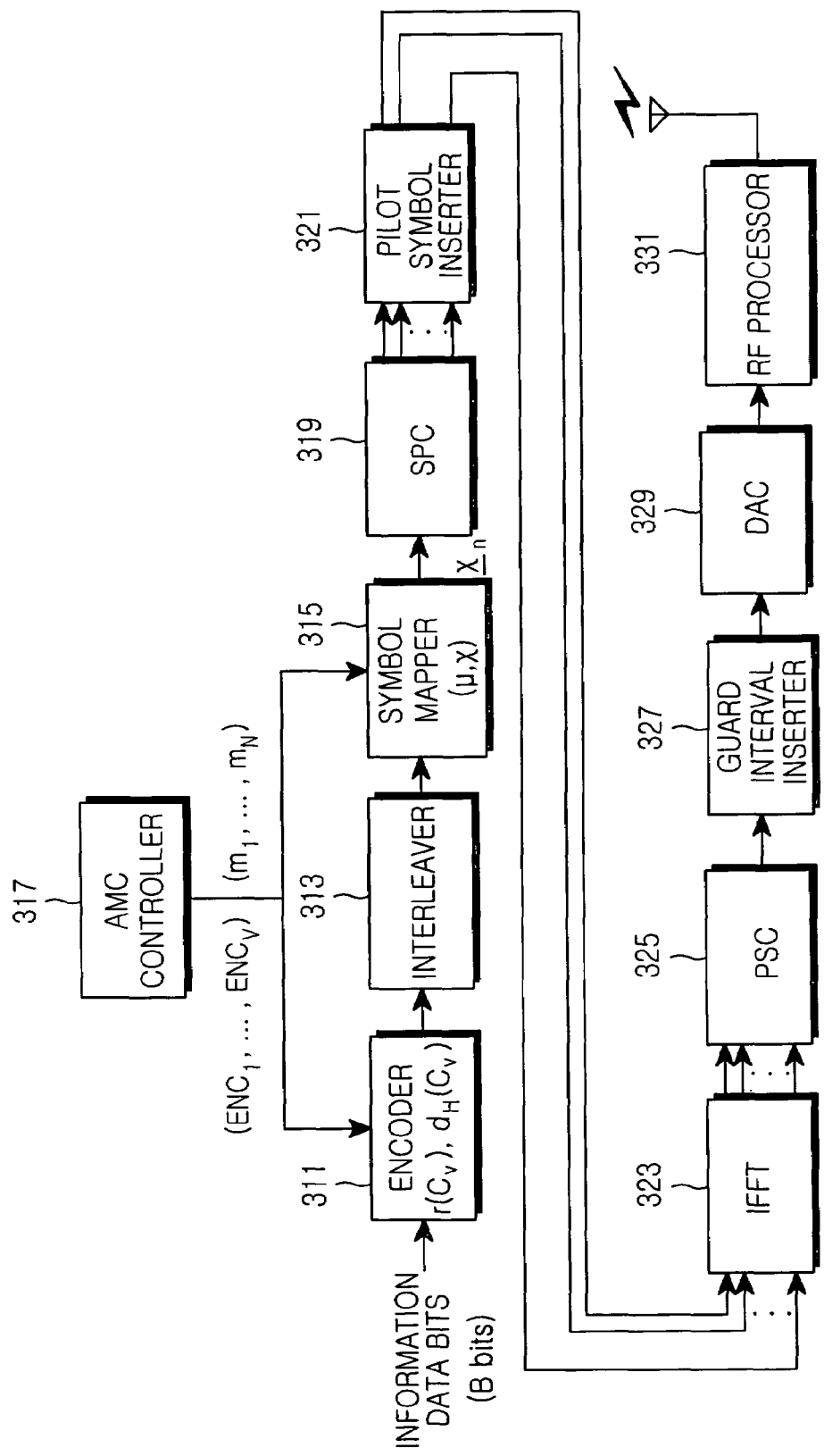
FIG. 3 is a schematic block diagram of a transmitter in an OFDM communication system to which the present invention is applied.

FIG. 3 is a schematic block diagram of a transmitter in an OFDM communication system to which the present invention is applied. Referring to FIG. 3, the transmitter comprises an encoder 311, an interleaver 313, a symbol mapper 315, an AMC controller 317, an SPC 319, a pilot symbol inserter 321, an IFFT 323, a PSC 325, a guard interval inserter 327, a DAC 329, and an RF processor 331.

User data bits or control data bits to be transmitted are generated and provided to the encoder 311. As indicated above, the user data bits or control data bits are commonly called information data bits. The encoder 311 encodes the information data bits in a coding method such as convolutional coding or turbo coding with a predetermined coding rate under the control of the AMC controller 317. The AMC controller 317 determines the coding method, that is, the coding rate according to the channel state of the OFDM communication system. An operation in the AMC controller 317 for determining the coding method will be detailed later. The interleaver 313 interleaves the coded bits in a predetermined interleaving method. The interleaving method can be random interleaving.

The symbol mapper 315 modulates the interleaved bits in a modulation method under the control of the AMC controller 317. The AMC controller 317 determines the modulation method according to the channel state of the OFDM communication system. An operation in the AMC controller 317 for determining the modulation method will be detailed later.

The SPC 319 converts a serial modulation symbol sequence to parallel symbols. The pilot symbol inserter 321 inserts pilot symbols in the parallel modulation symbols.

The IFFT 323 performs an N-point inverse fast Fourier transformation on the signal received from the pilot symbol inserter 321. The PSC 325 serializes the IFFT symbols, and the guard interval inserter 327 inserts a guard interval in the serial symbols. The guard interval eliminates interference between an OFDM symbol transmitted in a previous OFDM symbol time and a current OFDM symbol to be transmitted in a current OFDM symbol time. The guard interval can be produced as a cyclic prefix or as a cyclic postfix. The cyclic prefix is created by copying a predetermined number of last samples of an OFDM symbol in the time domain and inserting them in an effective OFDM symbol, while the cyclic postfix is created by copying a predetermined number of first samples of an OFDM symbol in the time domain and inserting them in an effective OFDM symbol.

The DAC 329 converts the digital signal received from the guard interval inserter 327 to an analog signal. The RF processor 331, including a filter and a front end unit, processes the analog signal such that it can be transmitted. The RF signal is transmitted via a transmit antenna.

Figure 4:
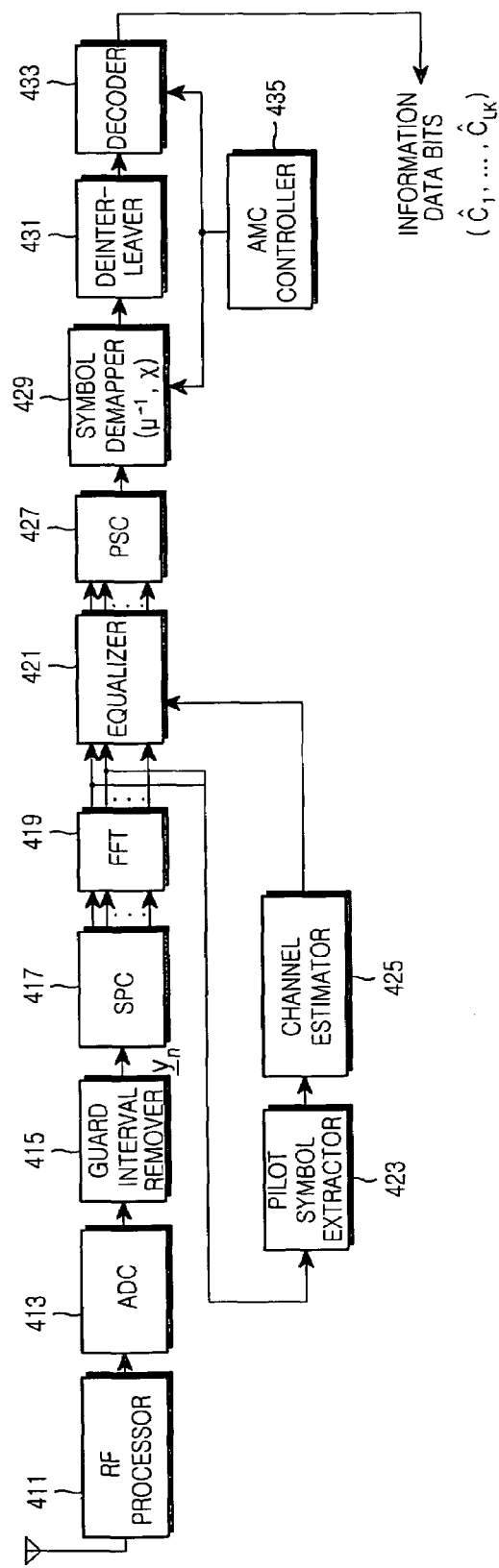
FIG. 4 is a schematic block diagram of a receiver in the OFDM communication system to which the present invention is applied.

FIG. 4 is a schematic block diagram of a receiver in the OFDM communication system to which the present invention is applied. Referring to FIG. 4, the receiver comprises an RF processor 411, an ADC 413, a guard interval remover 415, an SPC 417, an FFT 419, an equalizer 421, a pilot symbol extractor 423, a channel estimator 425, a PSC 427, a symbol demapper 429, a deinterleaver 431, a decoder 433, and an AMC controller 435.

A signal transmitted from the transmitter illustrated in FIG. 3 experiences a multi-path channel and is received as a signal having noise at a receive antenna. The RF processor 411 downconverts the signal received from the receive antenna to an IF signal. The ADC 413 converts the analog IF signal to a digital signal and the guard interval remover 415 removes a guard interval from the digital signal. The SPC 417 parallelizes the serial signal received from the guard interval remover 415 and the FFT 419 performs an N-point fast Fourier transformation on the parallel signals. The equalizer 441 channel-equalizes the FFT signal, and the PSC 427 serializes the equalized signal.

Meanwhile, the pilot symbol extractor 423 detects pilot symbols from the FFT signal and the channel estimator 425 estimates a channel using the pilot symbols and provides the channel estimation result to the equalizer 421. The receiver creates a CQI corresponding to the channel estimation result and transmits the CQI to the transmitter through a CQI transmitter (not shown).

The symbol demapper 429 demodulates the serial signal received from the PSC 427 in a demodulation method corresponding to the modulation method used in the transmitter. The symbol demapper 429 receives information about the modulation method used in the transmitter from the AMC controller 435. The AMC controller 435 receives additional information about the modulation method from the transmitter, although not shown. The deinterleaver 431 deinterleaves the demodulated symbols in a deinterleaving method corresponding to the interleaving method used in the transmitter. The decoder 433 decodes the deinterleaved symbols in a decoding method corresponding to the coding method used in the transmitter and outputs original information data bits. The decoder 431 receives information about the coding method used in the transmitter from the AMC controller 435. The AMC controller 435 receives additional information about the coding method from the transmitter.

Now a description of the AMC controller 317 will be given herein below.

For example, the transmitter illustrated in FIG. 3 transmits B bits in L OFDM symbols. The encoder 311 encodes the input information bits using one of a number of available coding methods with V different coding rates. A vth coding rate is $r(C_v)$. The AMC controller 317 controls the coding method. Therefore, the B information bits are encoded at the coding rate of $r(C_v)$ in the vth coding method by the encoder 311. Here, the coded bits are denoted by $C_v$, and $C_v$ has a minimum Hamming distance of $d_H(C_v)$.

The symbol mapper 315 converts the coded bits $C_v$ to complex signals for respective carriers according to a Gray-mapping method. One OFDM symbol includes N sub-carrier signals and each of the N sub-carriers transmits $m_i$ (i=1, 2, ..., N) bits. Therefore, one OFDM symbol transmits $$K\left(=\sum_{i=1}^{N} M_i\right)$$

bits. The present invention takes a square-QAM as a modulation scheme and assumes that $m_i$ is an even number.

A received signal is converted to frequency-domain complex signals by the FFT 419 illustrated in FIG. 4. The symbol demapper 429 calculates a bit-by-bit soft metric during symbol demapping by $$\lambda'(y_n(l), n, b) = -\min_{x \in \chi_b^{(i,n)}} \frac{|y_n(l) - H_n x|^2}{\sigma^2} \quad (1)$$

where l is the index of an OFDM symbol, n is the index of a sub-carrier, $H_n$ is the fading coefficient of the nth sub-carrier, $y_n(l)$ is a received complex signal on the nth sub-carrier in the lth OFDM symbol, $\sigma^2$ is a noise variance under the assumption of Gaussian distribution, and $\chi_b^{(i,n)}$ is a set of complex signals with b (0 or 1) in an ith bit on the nth sub-carrier. The AMC controller 435 controls the demapping (demodulation) of the symbol demapper 429.

The decoder 433 detects from the demodulated coded bits $C_v$ a code sequence $c_k$ (k=1, ..., LK) that maximizes $$\sum_{k=1}^{LK\lambda^i} (y_n(1), n, c_k)$$

and outputs the code sequence as final decoded bits under the control of the AMC controller 435.

The AMC controller 317 first determines the coding method and modulation method by optimization using the following equations:

$$\max_{\substack{i \in \{1,...,V\} \\ m_1,...m_N \\ P_1,...,P_N}} R = r(C_i) \sum_{n=1}^{N} m_n \quad (2)$$

$$m_n \leq \min\left\{\log_2\left(1 + \frac{d_H(C_i)|H_n|^2 \tilde{P}_n}{\Gamma}\right), m_{max}\right\} \quad (3)$$

$$\sum_{n=1}^{N} \tilde{P}_n \leq P_T \quad (4)$$

where i is the index of a coding method available in the OFDM communication system, $r(C_i)$ is the coding rate of an ith coding method $C_i$, $m_n$ is the number of bits transmitted on an nth sub-carrier, $P_n$ is the transmit power of bits transmitted on the nth sub-carrier, $m_{max}$ is the maximum number of bits transmittable for each of the sub-carriers, $P_T$ is maximum transmit power available in the OFDM communication system, and $\Gamma$ is a constant determined by a PER.

By the above computation, the AMC controller 317 assigns a transmit power and a number of transmission bits to each sub-carrier according to a Levin-Campello algorithm for a coding method $C_i$ available in the OFDM communication system. The Levin-Campello algorithm is disclosed in T. Starr, J. M. Cioffi and P. J, Silverman, "Understanding Digital Subscriber Line Technology", Prentice Hall, 1999. Accordingly, the assignment of the transmit power and the number of transmission bits for each sub-carrier using the Levin-Campello algorithm will not be described in detail herein because it is beyond the scope of the present invention.

The AMC controller 317 selects as a coding method for the encoder 311 the coding method CV having a maximum data rate among the V coding methods obtained by the Levin-Campello algorithm. Also, the AMC controller 317 assigns transmit power ($P_1, \ldots P_N$) having the maximum data rate to the respective sub-carriers. The AMC controller 317 determines $m_1, \ldots, m_N$ having the maximum data rate as the number of bits to be transmitted on each sub-carrier.

The transmit power for each sub-carrier ($P_1, \ldots P_N$) is calculated by multiplying a predetermined scaling factor by transmit power for each sub-carrier ($\tilde{P}_1, \ldots \tilde{P}_N$) determined by the AMC controller 317. The scaling factor is determined by a bit delivered most on the N sub-carriers. That is, if the most used transmission bit is $m_j \in \{m_1, m_2, \ldots, m_{max}\}$ among $m_1, \ldots, m_N$, $$P_n = \gamma_j \tilde{P}_n \quad (5)$$

where $\gamma_j$ is a power scaling factor based on the fact that the power gain effect of a channel code varies with a transmission bit. In Equation (5), $\gamma_j \in \{\gamma_1, \ldots \gamma_{max}\}$, ($\gamma_{max} \leq \ldots \leq \gamma_2 \leq \gamma_1 \leq 1$).

The AMC scheme according to the present invention can support a maximum data rate with a minimum transmit power, satisfying a maximum transmit power limit and an error correction capability requirement in the OFDM communication system. More specifically, the maximum data rate is achieved by optimization in Equation (2), and a maximum transmit power for each sub-carrier is limited by Equation (3). The pairwise error probability (PEP) of decoding a code $\underline{c}$ transmitted from the transmitter to a code $\underline{\hat{c}}$ spaced from $\underline{c}$ by d bits in a decoder is limited by $$P(d, H_1, \ldots, H_N) \leq \quad (6)$$

$$K^{-d} \sum_{\underline{S}} 2^{-\sum_{k=1}^{d}(m_{n_k}-1)} \sum_{x \in \chi_{\underline{c}}^{\underline{S}}} Q\left(\sqrt{\frac{\sum_{k=1}^{d} |H_{n_k}|^2 |x_k - \hat{v}_k|^2}{2\sigma^2}}\right) \leq$$

$$K^{-d} \sum_{\underline{S}} 2^{-\sum_{k=1}^{d}(m_{n_k}-1)} \sum_{x \in \chi_{\underline{c}}^{\underline{S}}} Q\left(\sqrt{\frac{\sum_{k=1}^{d} |H_{n_k}|^2 d_{min,n_k}^2}{2\sigma^2}}\right) \leq$$

$$Q\left(\sqrt{\frac{3d\Gamma}{d_H(C_i)}}\right) \leq Q(\sqrt{3\Gamma})$$

where $\underline{c} = (c_1, \ldots, c_d)$ denotes code values at d different bit positions and $\underline{S} = (i_1, n_1) \times \ldots \times (i_d, n_d)$ denote the Cartesian products of bit positions to which the d bits are mapped and sub-carrier pairs ($\chi_{\underline{c}}^{\underline{S}} = \chi_{c_1}^{(i_1, n_1)} \times \ldots \times \chi_{c_d}^{(i_d, n_d)}$). $\chi_{c_k}^{(i_k, n_k)}$ is a set of complex signals with an $i_k^{th}$ bit value being $c_k$ (0 or 1) on an $n^k$th sub-carrier. In Equation (6), $d_{min,n_k}$ is the minimum Euclidean distance of the $n^k$th sub-carrier to which a kth bit is mapped, and $\underline{v}=(v_1, \ldots, v_d)$ exists solely in the Gray mapping as the nearest signal spaced by a minimum Euclidean distance on $\chi_c^S$ for $\underline{x} \in \chi_c^S$.

The inequation in the second row of Equation (6) is based on the presupposition in Equation (7).

$$|x_k - v_k| \geq d_{min,n_k} \quad (7)$$

For a square-QAM signal, when Equation (3) is computed, the inequation in the third row of Equation (6) is based on the presupposition in Equation (8).

$$a'^2_{min,n_k} = \frac{6}{2^{m_{n_k}}-1} \tilde{P}_n \geq \frac{\Gamma}{d_H(C_i)|H_{n_k}|^2} \quad (8)$$

Equation (4) is the condition of limiting the total transmit power of the OFDM communication system for the optimization of Equation (2). The bound on the PEP as used in Equation (6) shows less tightness as more transmission bits are assigned to each sub-carrier. This is attributed to the tightness of the inequation in the second row of Equation (6), which becomes less tight as the number of transmission bits for each sub-carrier increases. In this case, the transmit power assignment optimized by Equation (2) offers an error rate far below a predetermined value, that is, it offers a greater error correction capability than needed. Therefore, the resulting resources waste is prevented by reducing the total transmit power of the OFDM communication system using the scaling factor described in Equation (5).

Figure 5:
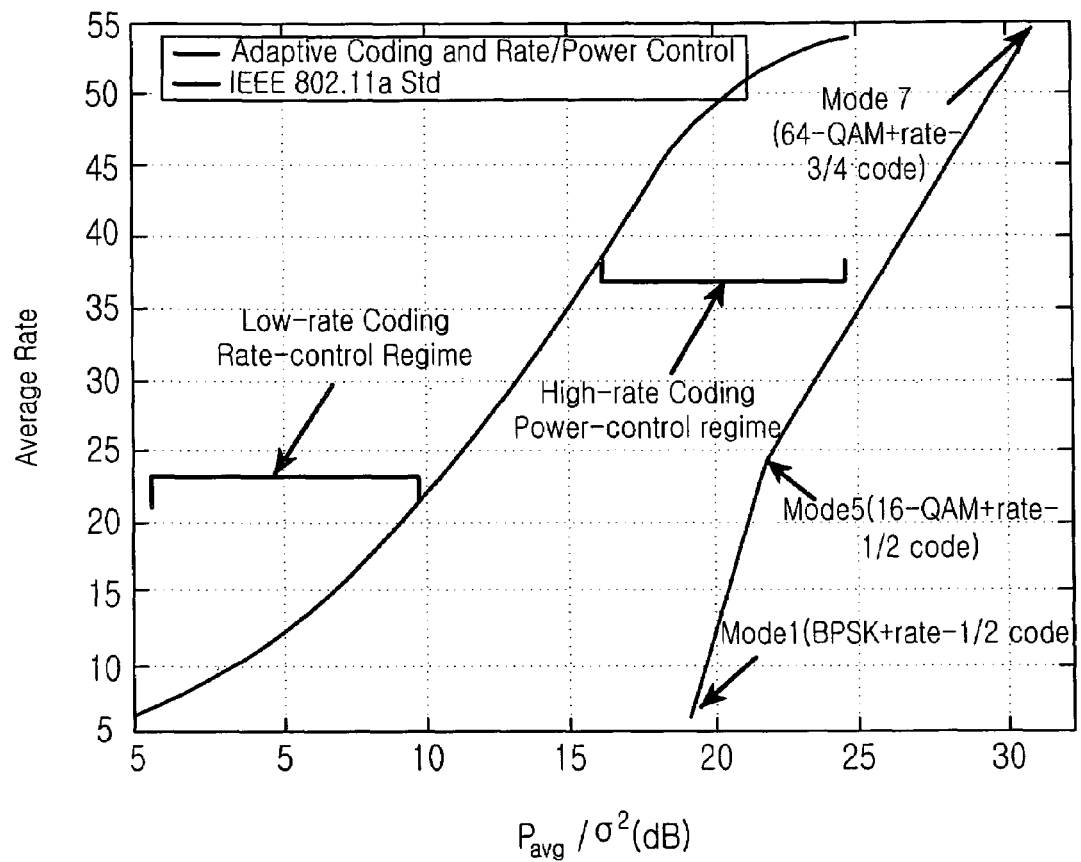
FIG. 5 is a graph comparing a data rate the conventional OFDM communication system with the OFDM communication system utilizing an AMC method according to the present invention.

FIG. 5 is a graph comparing a data rate the typical OFDM communication system with the OFDM communication system utilizing an AMC method according to the present invention. However, before describing FIG. 5, the OFDM communication system is assumed to be based on IEEE 802.11a. Therefore, a 64-state, rate-1/2 convolutional code as provided in an IEEE 802.11a standard specification, a rate-2/3 punctured code, and a rate-3/4 punctured code are available in the OFDM communication system. The codes have minimum Hamming distances of 10, 6, and 5, respectively. A QPSK, 16 QAM, or 64 QAM signal is transmitted on each sub-carrier in conformance with the IEEE.802.11a standards, and a data packet is 20-byte binary data, which is randomly generated.

In conformance with the IEEE.802.11a standards, transmission parameters and modulation are determined by Gray mapping. Random interleaving is used as a bit block interleaving method. An indoor NLOS (Non-Light Of Sight) exponentially-decaying multipath Rayleigh fading model and a quasi-static fading environment are simulated and the average energy of the total channel path fading is normalized to 1. An average channel delay spread is 50 ns.

The total transmit power $P_\gamma$ of the OFDM communication system is set to 0 dBm and a power scaling factor is determined according to transmission bits such that $\gamma_1 = 0$ dB (QPSK), $\gamma_2 = -0.8$ dB (16 QAM), and $\gamma_3 = -1.5$ dB (64 QAM). It is also assumed that the PER is limited to about 1% by setting $\Gamma = 8.8$ dB in Equation (3).

Referring to FIG. 5, under the above conditions, a higher data rate is available at the same transmit power when the AMC scheme according to the present invention is used than otherwise. Especially, at a low-rate mode of 6 Mbp, a transmit power gain of 19 dB or higher is achieved, which implies that the use of the AMC scheme provides a wider service range than available in the typical OFDM communication system based on IEEE 802.11a.

Figure 6:
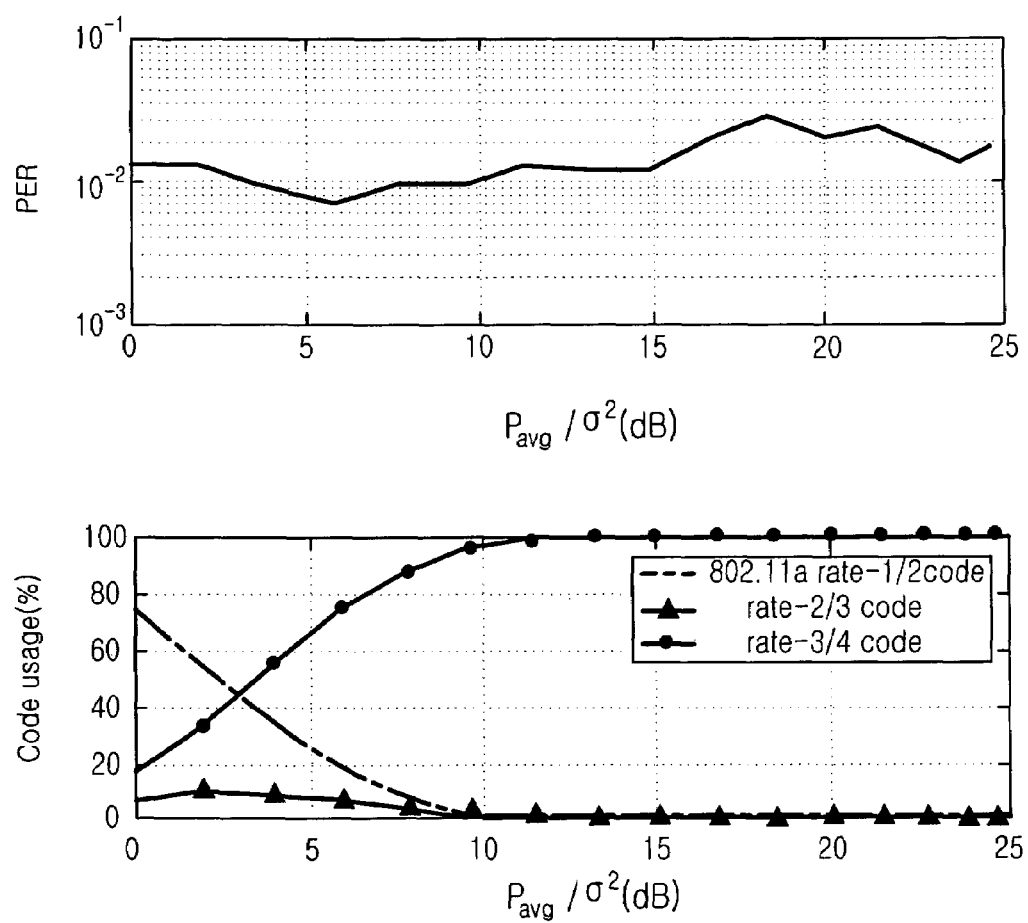
FIG. 6 is a graph comparing a packet error rate (PER) and code usage the conventional OFDM communication system with the OFDM communication system utilizing an AMC method according to the present invention.

FIG. 6 is a graph comparing a PER and code usage in the conventional OFDM communication system with the OFDM communication system utilizing an AMC method according to the present invention. Referring to FIG. 6, under the same conditions as described above with reference to FIG. 5, the use of the AMC scheme of the present invention enables signal transmission/reception with a target PER of approximately 1%. Also, a code with a low coding rate is used under a relatively high-noise channel environment, and a code with a high coding rate is used under a relatively low-noise channel environment.

Below, Table 1 lists average transmit powers versus power to noise ratios when the AMC scheme is implemented.

TABLE 1

| $1/\sigma^2$ (dBm/Hz) | 0 | 4 | 8 | 12 | 16 | 20 | 24 | 28 |
|---|---|---|---|---|---|---|---|---|
| $P_{avg}$ (dBm) | −0.15 | −0.12 | −0.22 | −0.56 | −0.97 | −1.59 | −2.54 | −4.17 |
| PER (%) | 1.3 | 0.9 | 0.9 | 1.2 | 1.1 | 2.7 | 2.2 | 1.3 |

As noted from Table 1, the total transmit power reaches almost up to a limit in a relatively high-noise channel environment, while only part of the total transmit power is used in a relatively low-noise channel environment, thereby enabling low-power transmission.

As described above, the present invention advantageously maximizes transmission capacity by using a frequency-selective AMC scheme based on sub-channel assignment in the two-dimensional time-frequency domain in an OFDMA (Orthogonal Frequency Division Multiple Access) communication system. Also, a diversity sub-channel and an AMC sub-channel are adaptively assigned to a terminal according to its channel state, such that service can be provided considering the characteristics of the terminal. The inventive sub-channel assignment minimizes the probability of sub-channels from neighbor base stations colliding with each other, thereby preventing the degradation of system performance, which might otherwise result from sub-channel collisions.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of controlling adaptive modulation and coding (AMC) in an orthogonal frequency division multiplexing (OFDM) communication system in which an entire frequency band is divided into a plurality of sub-carrier bands, comprising the steps of:

(1) calculating a power and a number of transmission bits for each of the sub-carriers in a predetermined method for each coding method available in the OFDM communication system;

(2) calculating a data rate for each coding method based on the number of transmission bits and the power for each sub-carrier;

(3) determining a coding method having a highest of the calculated data rates for the OFDM communication system; and (4) determining a modulation method for the OFDM communication system according to a number of transmission bits in the determined coding method;

wherein the step of calculating the number of transmission bits and the power for each sub-carrier for each of the coding methods is performed by $$\max_{\substack{i \in \{1,\ldots,V\} \\ m_1,\ldots m_N \\ \tilde{P}_1,\ldots,\tilde{P}_N}} R = r(C_i) \sum_{n=1}^{N} m_n$$

where i is an index of a coding method available in the OFDM communication system, $R(C_i)$ is a coding rate of an ith coding method $C_i$, and $m_n$ is a number of transmission bits for an nth sub-carrier $P_n$ is transmit power of bits transmitted on the nth sub-carrier.

2. The method of claim 1, further comprising the steps of:
(5) applying a scaling factor to the calculated power for the determined coding method; and
(6) determining a resulting power as the power for each sub-carrier.

3. The method of claim 2, wherein the scaling factor is determined according to a number of bits included most in the transmission bits for each sub-carrier.

4. The method of claim 1, wherein the number of transmission bits and the power for each sub-carrier calculated by $$\max_{\substack{i \in \{1,\ldots,V\} \\ m_1,\ldots m_N \\ \tilde{P}_1,\ldots,\tilde{P}_N}} R = r(C_i) \sum_{n=1}^{N} m_n$$

are limited by $$m_n \leq \min\left\{\log_2\left(1 + \frac{d_H(C_i)|H_n|^2 \tilde{P}_n}{\Gamma}\right), m_{\max}\right\}$$

where $d_H(C_i)$ is a minimum Hamming distance of bits coded in an ith coding method $C_i$, $H_n$ is a fading coefficient of an nth sub-carrier, $m_{max}$ is a maximum number of bits transmittable for each of the sub-carriers, and $\Gamma$ is a constant determined by a packet error rate, $$\sum_{n=1}^{N} \tilde{P}_n \leq P_T$$

where $P_T$ is a maximum transmit power available in the OFDM communication system.

5. The method of claim 1, wherein the modulation method is Gray mapping.

6. The method of claim 1, wherein the predetermined method is a Levin-Campello algorithm.

7. An apparatus for controlling adaptive modulation and coding (AMC) in an orthogonal frequency division multiplexing (OFDM) communication system in which an entire frequency band is divided into a plurality of sub-carrier bands, comprising:
an AMC controller for calculating a power and a number of transmission bits for each of the sub-carriers in a predetermined method for each coding method available in the OFDM communication system, calculating a data rate for each coding method based on the number of transmission bits and the power for each sub-carrier, determining a coding method having a highest of the calculated data rates for the OFDM communication system, and determining a modulation method for the OFDM communication system according to a number of transmission bits in the determined coding method;
an encoder for encoding input information data bits in the determined coding method; and
a modulator for modulating coded bits received from the encoder in the determined modulation method;
wherein the AMC controller calculates the number of transmission bits and the power for each sub-carrier for each of the coding methods by $$\max_{\substack{i \in \{1,\cdots,V\} \\ m_1,\cdots m_N \\ \tilde{P}_1,\cdots,\tilde{P}_N}} R = r(C_i) \sum_{n=1}^{N} m_n$$

where i is an index of a coding method available in the OFDM communication system, $r(C_i)$ is a coding rate of an ith coding method $C_i$, and $m_n$ is a number of transmission bits for an nth sub-carrier $P_n$ is transmit power of bits transmitted on the nth subcarrier.

8. The apparatus of claim 7, further comprising a transmitter for performing an inverse fast Fourier transform (IFFT) on a modulated signal received from the modulator and RE (Radio Frequency)-processing the IFFT signal.

9. The apparatus of claim 8, wherein the AMC controller applies a scaling factor to the calculated power for the determined coding method and determines a resulting power as the power for each sub-carrier.

10. The apparatus of claim 9, wherein the AMC controller determines the scaling factor according to a number of bits included most in the transmission bits for each sub-carrier.

11. The apparatus of claim 7, wherein the AMC controller limits the number of transmission bits and the power for each sub-carrier calculated by $$\max_{\substack{i \in \{1,\cdots,V\} \\ m_1,\cdots m_N \\ \tilde{P}_1,\cdots,\tilde{P}_N}} R = r(C_i) \sum_{n=1}^{N} m_n$$

using $$m_n \leq \min\left\{\log_2\left(1 + \frac{d_H(C_i)|H_n|^2 \tilde{P}_n}{\Gamma}\right), m_{\max}\right\}$$

where $d_H(C_i)$ is a minimum Hamming distance of bits coded in an ith coding method $C_i$, $H_n$ is a fading coefficient of an nth sub-carrier, $m_{max}$ is a maximum number of bits transmittable for each of the sub-carriers, and $\Gamma$ is a constant determined by a packet error rate, $$\sum_{n=1}^{N} \tilde{P}_n \leq P_T$$

where $P_T$ is a maximum transmit power available in the OFDM communication system.

12. The apparatus of claim 7, wherein the modulation method is Gray mapping.

13. The apparatus of claim 7, wherein the predetermined method is a Levin-Campello algorithm.

* * * * *